(12) United States Patent
Schleiden et al.

(10) Patent No.: US 9,347,346 B2
(45) Date of Patent: May 24, 2016

(54) OIL MIST SEPARATOR FOR A CRANKCASE VENTILATION FOR SEPARATING PARTICLES AND CORRESPONDING METHOD

(71) Applicant: MANN+HUMMEL GMBH, Ludwigsburg (DE)

(72) Inventors: Thomas Schleiden, Oberstenfeld (DE); Christoph Muy, March (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 85 days.

(21) Appl. No.: 14/259,732

(22) Filed: Apr. 23, 2014

(65) Prior Publication Data

US 2014/0352539 A1 Dec. 4, 2014

(30) Foreign Application Priority Data

Apr. 23, 2013 (DE) .................. 10 2013 006 954
Apr. 23, 2013 (DE) .................. 10 2013 006 955

(51) Int. Cl.

| | |
|---|---|
| *B01D 45/00* | (2006.01) |
| *F01M 13/04* | (2006.01) |
| *B01D 45/04* | (2006.01) |
| *B01D 46/00* | (2006.01) |
| *B01D 45/08* | (2006.01) |
| *B01D 45/16* | (2006.01) |
| *B01D 50/00* | (2006.01) |
| *B01D 45/12* | (2006.01) |
| *B03C 3/017* | (2006.01) |
| *F24D 11/00* | (2006.01) |
| *F01M 13/02* | (2006.01) |

(52) U.S. Cl.
CPC ............... *F01M 13/04* (2013.01); *B01D 45/04* (2013.01); *B01D 45/08* (2013.01); *B01D 45/12* (2013.01); *B01D 45/16* (2013.01); *B01D 46/0005* (2013.01); *B01D 46/0019* (2013.01); *B01D 46/0086* (2013.01); *B01D 50/002* (2013.01); *B03C 3/017* (2013.01); *F01M 2013/026* (2013.01); *F01M 2013/0433* (2013.01); *F24D 11/007* (2013.01); *F24D 11/008* (2013.01)

(58) Field of Classification Search
CPC ..... B03C 3/017; F24D 11/007; F24D 11/008; B01D 45/04; B01D 46/0086; B01D 45/08; B01D 45/16; B01D 46/0005; B01D 46/0019; B01D 50/002; B01D 45/12; F01M 2013/0433; F01M 2013/026; F01M 13/04
USPC ........... 55/440–446, 320–325, 334–340, 361, 55/459.1, 447, 434, 462–465, 385.3; 95/272
See application file for complete search history.

(56) References Cited

U.S. PATENT DOCUMENTS

| 6,101,886 A * | 8/2000 | Brenizer ............... B01D 45/08 55/308 |
|---|---|---|
| 6,536,211 B1 | 3/2003 | Borgstrom et al. |
| 8,357,232 B1 * | 1/2013 | Morrison ............... B01D 53/24 55/404 |
| 2011/0252968 A1 * | 10/2011 | M?kinen ............... B01D 45/08 95/267 |
| 2013/0319239 A1 * | 12/2013 | Takenaka ............ G01N 1/2273 95/267 |
| 2014/0165977 A1 * | 6/2014 | Copley ................. B01D 45/08 123/573 |

FOREIGN PATENT DOCUMENTS

| DE | 29905302 U1 | 6/1999 |
|---|---|---|
| DE | 202007010776 U1 | 12/2008 |

* cited by examiner

*Primary Examiner* — Dung H Bui
(74) *Attorney, Agent, or Firm* — James Hasselbeck

(57) ABSTRACT

Oil mist separator (1) for a crankcase ventilation for separating particles (2) from a fluid (3) guided from a first fluid line (14) to a deflector body device (20), with a device (10) for actively accelerating the fluid (3) in the first fluid line (14).

7 Claims, 2 Drawing Sheets

OIL MIST SEPARATOR FOR A CRANKCASE VENTILATION FOR SEPARATING PARTICLES AND CORRESPONDING METHOD

CROSS-REFERENCE TO RELATED APPLICATION

This application claims the benefit of German patent application No. 10 2013 006 954.8 filed Apr. 23, 2013, the entire contents of the aforesaid German patent application being incorporated herein by reference.

TECHNICAL FIELD

The present invention relates to a device for separating particles from a fluid, such as for example an oil mist separator for crankcase ventilation for separating particles, and a corresponding method.

BACKGROUND

This section describes background references which are not necessarily prior art.

DE 20 2007 010 776 U1 describes an oil mist separator for internal combustion engines with a centrifugal separator having a disk separator and a gas guide ring axially surrounding a rotor, in which the gas guide ring is configured to be non-rotational relative to a rotor and the gas guide ring is moveable in the axial direction and is acted on by a spring force.

DE 299 05 302 U1 describes an electric separating apparatus, having two or more discharge electrodes, which can be connected to a common electrical supply line, and having an electrically insulating electrode holder.

DE 699 320 51 T2 describes a method for cleaning gases, which were produced by a combustion engine, of solid and/or liquid suspended particles found therein, wherein the gases to be cleaned are guided through a separating chamber, where the gases are set into rotation by a rotating element so that the suspended particles are separated from the gases by centrifugal force.

SUMMARY OF THE DISCLOSURE

Therefore, an object of the present invention is making available an improved device for separating particles from a fluid and in particular an oil separator for crankcase ventilation.

Correspondingly, a device for separating particles from a fluid guided from a first fluid line to a deflector body device is made available. Said device comprises a device for actively accelerating the fluid in the first fluid line. One can alternately refer to a separating apparatus.

For example, the device is configured as an oil mist separator for crankcase ventilation. The oil mist separator is provided in particular for combustion engines and enables the leakage gas containing oil that develops in the crankcase, the so-called blow-by gas, to be returned to the combustion process.

One advantage of the separating apparatus is that an improved separation efficiency is achieved without the pressures losses that accompany separation.

According to a further aspect, a method for separating particles from a fluid guided from a first fluid line to a deflector body device is proposed. The method for separating the particles comprises: Actively accelerating the fluid in the first fluid line, and separating the particles from the actively accelerated fluid with the aid of the deflector body device.

In embodiments of the separating apparatus or of the separating method, the device for active acceleration can be designed to accelerate the fluid in the first fluid line with the aid of at least one fluid jet initiated from a second fluid line into the first fluid line.

In embodiments, the device has at least one propulsion jet nozzle at the end of the second fluid line for initiating the at least one fluid jet into the first fluid line.

In embodiments, the at least one propulsion jet nozzle can be configured such that the at least one fluid jet expands in the first fluid line and the fluid in the first fluid line is actively accelerated with the expanded at least one fluid jet.

In further embodiments, the separating apparatus is configured such that the second fluid line is coupled to a fluid stream of a compressor and/or to a charge-air stream of a turbocharger.

For example, the first fluid line has at least one nozzle, into which the propulsion jet nozzle flows and/or extends. The propulsion jet nozzle can thus be disposed in front of the nozzle, wherein then the corresponding propulsion jet enters the nozzle. Alternatively, the propulsion jet nozzle can project into the nozzle. The first fluid line can consist exclusively of the nozzle. Alternatively, the first fluid line can also have, in addition to the one nozzle, another nozzle and/or a constant line cross section. The other nozzle can be disposed downstream with respect to the nozzle.

The fluid is accelerated in the nozzle and at the same time brought to a higher pressure level. As a result, a pressure loss in the first fluid line that develops without these measures can be equalized.

Furthermore, in embodiments, the at least one nozzle can have a cross section tapering towards a fluid progression direction of the fluid.

The separating apparatus is configured for example such that the at least one nozzle of the device is designed to deposit the particles on an interior wall of the at least one nozzle.

In embodiments, the separating apparatus furthermore comprises a housing device. The housing device comprises for example a raw fluid inlet and a purified fluid outlet, and/or a drain for collected particles and otherwise forms a fluid-tight housing.

For example, the separating apparatus configured as an oil mist separator can be designed to deposit as the fluid the particles of aerosol oil from an oil-laden gas. The particles can be for example oil droplets or even solids. Gas or fluids can be considered a particle-laden fluid.

Other embodiments of the invention are the subject matter of the dependent claims as well as the exemplary embodiments of the invention described in the following.

BRIEF DESCRIPTION OF THE DRAWINGS

The invention will be explained in greater detail in the following on basis of exemplary embodiments making reference to the enclosed figures.

The figures show.

Unless otherwise indicated, the same reference numbers designate the same or functionally equivalent elements in the figures.

DETAILED DESCRIPTION

In this case, particles denote any dispersed materials, which differ from the surrounding, continuous medium by a phase boundary interface, such as for instance solid or liquid constituent parts of aerosols in a fluid, the solid constituent parts of suspensions, the particulate matter of powders, but also drops of liquid in emulsions.

The oil mist separator can be described as a separating arrangement for separating particles from a particle-laden fluid.

Figure 1:
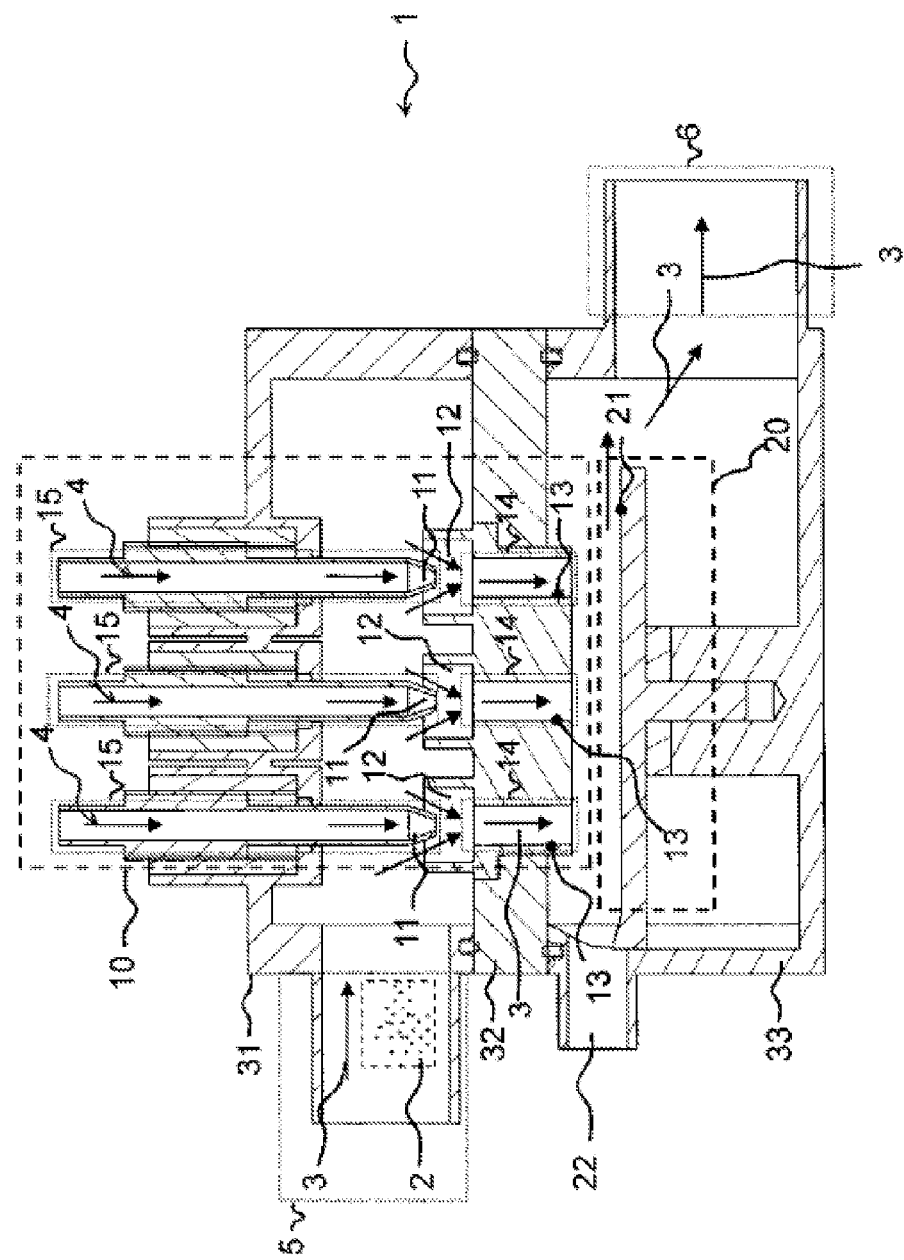
FIG. 1: A cross-sectional view of an embodiment of an oil mist separator for crankcase ventilation for separating particles from a fluid.

FIG. 1 shows a cross-sectional view of an embodiment of an oil mist separator 1 for separating dispersed particles 2 from a particle-laden fluid 3.

The particle-laden fluid 3 can be a leakage gas or a blow-by gas enriched with oil from a crankcase of an internal combustion engine of a motor vehicle. The dispersed particles 2 are for example residues of operating materials used by the respective internal combustion engine for lubrication, such as for instance oil or another lubricant.

The oil mist separator 1 comprises for example a device 10 for actively accelerating the fluid 3 and a deflector body device 20. The fluid 3 laden with particles 2 is introduced into the oil mist separator 1 through an inlet 5. After passing through the device 10 for active acceleration and the deflector body device 20, the fluid 3 leaves the oil mist separator 1 again for example through an outlet 6. Collected and separated oil or the like can be discharged at a drain 22 in the region of a deflector plate 21 of the deflector body device 20. An inlet 5, outlet 6 and drain 22 are provided as openings in a housing wall 31, 32, 33.

The inlet 5, the outlet 6 and the drain 22 of the oil mist separator 1 can also each be configured as a port or as an attachment pipe section.

The device 10 for actively accelerating the fluid 3 can be configured as an impactor driven by a propulsion jet. A fluid jet 4 can be used as the propulsion jet of the device 10 for active acceleration, wherein the fluid 3 can be accelerated in the first fluid line 14 with the aid of the fluid jet 4 initiated by at least one from a second fluid line 15 into the first fluid line 14. For example, the fluid jet 4 is a gas stream of a compressor or a charge-air stream of a turbocharger. In this respect, the separating apparatus 1 or the oil mist separator is coupled to a turbocharger device, a compressor or other compressed air supply.

The device 10 for active acceleration can furthermore be configured as a jet pump, in which the fluid 3 as a suction medium of the jet pump is accelerated by means of the momentum exchange through the initiated fluid jet 4 as a propulsion medium of the jet pump.

The first fluid line 14 and the second fluid line 15 can be configured as fluid line pipes or as other pipelines that are used to transport fluids such as gases or liquids.

Furthermore, the device 10 can have a least one propulsion jet nozzle 11 at the end of the second fluid line 15 to initiate the at least one fluid jet 4 into the first fluid line 14. In addition, the first fluid line 14 can have at least one nozzle 12. The propulsion jet nozzle 11 preferably projects into the nozzle 12. The at least one fluid jet 4 expands into the nozzle 12, wherein the fluid 3 in the nozzle 12 is carried along and thereby actively accelerated. At the same time, the fluid 3 experiences a pressure jump. Because of the expansion, it is conceivable that already in the fluid line 14, particles are deflected radially with respect to the flow-through direction, which is indicated as an arrow, and are deposited on the interior wall 13.

The nozzle 12 is configured for example as a tubular or conical inlet of the first fluid line 14.

The second fluid line 15 can be coupled to a fluid stream of a compressor and/or to a charge-air stream of a turbocharger.

For example, the deflector body device 20 comprises a deflector plate 21, on which the oil separation from the fluid 3 takes place. The deflector plate 21 can be provided, by means of a device, for example a spring, to be disposed at a variable distance from the first fluid line 14. For example, the variable distance can be adapted to a prevailing propulsion jet volume flow of the fluid jet 4 and/or a prevailing propulsion jet pressure of the fluid jet 4.

As the propulsion jet of the device 10, the fluid jet 4 can for example have a propulsion jet volume flow from 0 l/min to 5 l/min or of 0 l/min to 50 l/min or from 0 l/min to 100 l/min or an even higher propulsion jet volume flow.

Furthermore, the fluid jet 4 can have a propulsion jet pressure of 0 mbar to 50 mbar or of 0 mbar to 200 mbar or of 0 mbar to 400 mbar or a propulsion jet pressure of more than 400 mbar.

Because of the propulsion jet pressure of the fluid jet 4, it is possible for a pressure increase of the fluid 3 to be achieved in the nozzle 12 that is provided as an impactor chamber and/or in the first fluid line 14.

The deflector body device 20 can be configured as a passive inertial separator. In doing so, it is possible for every mechanical apparatus for separating substances of varying densities to be used as an inertial separator, in which the individual substances of the fluid 3 are deflected to varying degrees depending upon the inertia thereof by redirecting the flow of matter of the fluid 3.

Moreover, the deflector body device 20 may be configured as a passive inertial separator with a pressure loss corresponding to the propulsion jet pressure of the fluid jet 4, whereby maintaining a required crankcase negative pressure can be advantageously achieved.

The housing device 31, 32, 33 can be configured to be multi-piece, wherein individual units of the housing device 31, 32, 33 can enclose the device 10 and/or the deflector body device 20 and/or the first fluid line 14 and/or the second fluid line 15. In doing so, the individual units of the housing device 31, 32, 33 can be coupled to each other for example via welding or a screw connection. In the process, the housing parts 31, 32, 33 are designed to be fluid-tight.

The device 10, the propulsion jet nozzle 11, the nozzle 12, the deflector body device 20, the deflector plate 21 or the housing device 30 may comprise a plastic, a metal, such as for instance aluminum, magnesium or iron or steel or other ferrous and non-ferrous metals and alloys of the cited metals and metal compounds. In particular these components may all be produced from plastic.

Figure 2:
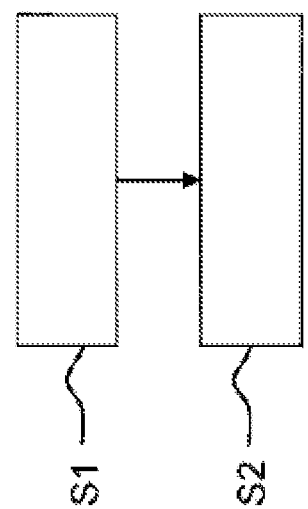
FIG. 2: A schematic representation of a flow chart of an embodiment of a method for separating particles from a fluid.

FIG. 2 shows a schematic representation of a flow chart of an embodiment of a method for separating particles from a fluid.

An active acceleration S1 of the fluid 3 in the first fluid line 14 takes place as a first step of the process.

A separation S2 of the particles 2 from the actively accelerated fluid 3 takes place as a second step of the process.

The steps of the process can be carried out to operate the oil mist separator 1 for separating dispersed particles from a particle-laden fluid.

Active acceleration S1 of the fluid 3 can take place for example with the aid of at least one fluid jet 4 initiated from a second fluid line 15 into the first fluid line 14.

Although the present invention was described on the basis of different exemplary embodiments, it is not restricted thereto, but can be modified in diverse ways. It is possible for other geometries than those depicted to be selected for the nozzle device and the deflector body device and for the separating arrangement.

The invention claimed is:

1. An oil mist separator separating particles from a particle laden fluid released from a crankcase by ventilation, comprising:
   at least one first fluid line having an inlet end and an outlet end, the inlet end having a first fluid line nozzle receiving the particle laden fluid;
   a deflector body device arranged at and spaced apart from the outlet end of the at least one first fluid line;
   a device operable to actively accelerate the particle laden fluid entering the inlet end of the at least one first fluid line towards the outlet end of the at least one first fluid line, the device comprising:
      at least one fluid jet discharging into the inlet end of the at least one first fluid line;
      at least one propulsion let nozzle arranged at an outlet end of at least one second fluid line and discharging fluid from the at least one fluid jet into the at least one first fluid line; and
      wherein the at least one propulsion let nozzle is designed such that fluid jet fluid in the at least one fluid let expands as it exits the at least one fluid let and enters the inlet end of the at least one first fluid line, the expansion of the fluid jet fluid accelerating the particle laden fluid in the at least one first fluid line;
   a housing device in which the at least one first fluid line, the second fluid line, the at least one propulsion let nozzle and the at least one fluid let are arranged;
   wherein the deflector body includes a deflector plate arranged at an outlet end of the at least one first fluid line and arranged to be impacted by fluid flowing from the outlet end of the at least one first fluid line; and
   wherein the deflector plate separates fluid particles from the fluid in the at least one first fluid line by impact.

2. The oil mist separator according to claim 1, wherein the device for active acceleration is operable to accelerate the particle laden fluid entering the inlet end of the at least one first fluid line by the at least one fluid jet discharging into the inlet end of the at least one first fluid line.

3. The oil mist separator according to one of claim 2, wherein
   the at least one second fluid line has an inlet end fluidically coupled to a fluid jet fluid stream of a compressor and/or to a charge-air stream of a turbocharger.

4. The oil mist separator according to one of claim 1, wherein
   wherein the at least one propulsion jet nozzle flows and/or extends into the first fluid line nozzle of the at least one first fluid line.

5. The oil mist separator according to claim 4, wherein
   the first fluid line nozzle has a cross section tapering and narrowing in a fluid flow progression direction of the fluid towards an outlet end of the at least one first fluid line nozzle.

6. The oil mist separator according to one of claim 4, wherein
   the at least one first fluid line nozzle of the device is operable to deposit fluid particles separated from the particle laden fluid onto an interior wall of the at least one first fluid line.

7. The oil mist separator according to one of claim 6, wherein the oil mist separator is operable to deposit the separated fluid particles of an aerosol oil from an oil-laden gas as a fluid onto the interior wall of the at least one first fluid line.

* * * * *